(12) United States Patent
Dyatlov et al.

(10) Patent No.: US 10,072,500 B2
(45) Date of Patent: Sep. 11, 2018

(54) GRAVITY MONITORING OF A WATER-FLOODED ZONE IN AREAL SWEEP

(71) Applicant: Baker Hughes Incorporated, Houston, TX (US)

(72) Inventors: Gleb Vladimirovich Dyatlov, Novosibirsk (RU); Yuliy Aleksandrovich Dashevsky, Novosibirsk (RU); Alexandr Nikolaevich Vasilevskiy, Novosibirsk (RU)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 741 days.

(21) Appl. No.: 14/347,520

(22) PCT Filed: Jun. 26, 2013

(86) PCT No.: PCT/RU2013/000544
§ 371 (c)(1),
(2) Date: Mar. 26, 2014

(87) PCT Pub. No.: WO2014/209152
PCT Pub. Date: Dec. 31, 2014

(65) Prior Publication Data
US 2015/0260039 A1 Sep. 17, 2015

(51) Int. Cl.
*E21B 49/08* (2006.01)
*G01V 7/00* (2006.01)
(Continued)

(52) U.S. Cl.
CPC .............. *E21B 49/087* (2013.01); *C09K 8/58* (2013.01); *E21B 43/16* (2013.01); *E21B 49/008* (2013.01);
(Continued)

(58) Field of Classification Search
CPC .......... E21B 49/08; E21B 4/008; E21B 43/16; G01F 23/20; G01V 7/00; G01V 7/06; C09K 8/58
See application file for complete search history.

(56) References Cited

U.S. PATENT DOCUMENTS

| 4,399,693 A | 8/1983 | Gournay |
| 5,218,864 A | 6/1993 | Pennybaker |
(Continued)

OTHER PUBLICATIONS

Schultz, Alton, "Monitoring fluid movement with the borehole gravity meter," Geophysics, vol. 54, No. 10, pp. 1267-1273 (Oct. 1989).
(Continued)

*Primary Examiner* — Mohamed Charioui
*Assistant Examiner* — Jeremy Delozier
(74) *Attorney, Agent, or Firm* — Mossman, Kumar & Tyler, PC

(57) ABSTRACT

Methods, systems, and devices for characterizing a water-flooded zone in an earth formation resulting from injection of water to the formation through an injector well borehole intersecting the formation. The method includes estimating horizontal elongation of the water-flooded zone using a gravity field change in the injector well borehole. Estimating horizontal elongation may include predicting a gravity field change for each of a plurality of model water-flooded zones for the borehole, wherein each model water-flooded zone is an elliptical cylinder having finite height and semi-axes; and fitting the gravity field change to one of the predicted gravity field changes corresponding to one of the plurality of elliptical cylinder model water-flooded zones. The gravity field change may comprise a difference between a first estimated gravity field in the injector well borehole before injection and a second estimated gravity field in the injector well borehole after injection.

14 Claims, 11 Drawing Sheets

(51) Int. Cl.
*G01F 23/20* (2006.01)
*E21B 49/00* (2006.01)
*E21B 43/16* (2006.01)
*C09K 8/58* (2006.01)
*G01V 7/06* (2006.01)

(52) U.S. Cl.
CPC ............... *G01F 23/20* (2013.01); *G01V 7/00* (2013.01); *G01V 7/06* (2013.01)

(56) References Cited

U.S. PATENT DOCUMENTS

| | | | |
|---|---|---|---|
| 7,890,264 B2* | 2/2011 | Elphick | E21B 43/16 166/250.07 |
| 2003/0220739 A1 | 11/2003 | Feldman et al. | |
| 2011/0042073 A1* | 2/2011 | Legendre | E21B 49/00 166/250.01 |

OTHER PUBLICATIONS

Brady, J.L. et al., "Gravity Methods: Useful Techniques for Reservoir Surveillance," SPE 26095, (May 1993).

Brady, J.L. et al., "Improved Production Log Interpretation in Horizontal Wells Using a Combination of Pulsed Neutron Logs, Quantitative Temperature Log Analysis, Time Lapse LWD Resistivity Logs and Borehole Gravity," SPE 46222 (May 1998).

Hadj-Sassi, K. et al., "Three-Dimensional Inversion of Borehole Gravity Measurements for Reservoir Fluid Monitoring," SPE 136928 (Apr. 2010).

Int'l Search Report and Written Opinion in PCT/RU2013/000544, dated Mar. 25, 2014.

* cited by examiner

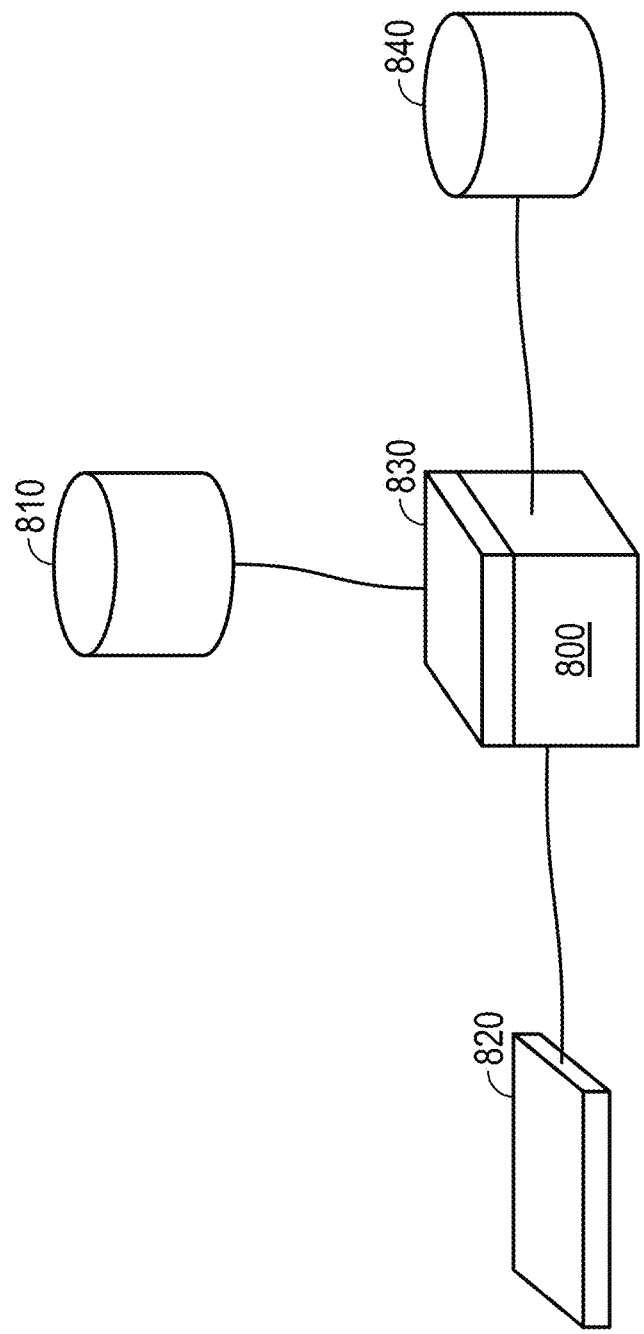

US 10,072,500 B2

GRAVITY MONITORING OF A WATER-FLOODED ZONE IN AREAL SWEEP

1. FIELD OF THE DISCLOSURE

In one aspect, this disclosure generally relates to methods and apparatuses for characterizing a parameter of interest of an earth formation using gravitational measurements. In another aspect this disclosure generally relates to methods and apparatuses for monitoring and control of the water flood process using time-lapse measurements of the gravitational field in the injector.

2. BACKGROUND OF THE ART

In many fields of endeavor, it may be useful to characterize a parameter relating to an earth formation, such as parameters relating to one or more fluids of the earth formation. For example, in exploration, development, and monitoring related to hydrocarbon production, it is important to make accurate measurements of geologic formations. The geologic formations below the surface of the earth may contain reservoirs of oil and gas or underground bodies of water. The geologic formations may include formation layers and various structures. In a quest for oil and gas, it is important to know about the location and composition of the formation layers and the various structures. In particular, it is important to know about the geologic formations with a high degree of accuracy so that resources are not wasted. In some applications it may also be useful to monitor fluids injected into the formation to increase production of hydrocarbons. The present disclosure addresses the need to characterize gravity measurements to estimate the behavior of injected fluids.

SUMMARY

In one aspect, this disclosure generally relates to methods, systems, and devices for characterizing a water-flooded zone in an earth formation resulting from injection of water to the formation through an injector well borehole intersecting the formation. Method aspects include estimating horizontal elongation of the water-flooded zone using a gravity field change in the injector well borehole. Estimating horizontal elongation may include predicting a gravity field change for each of a plurality of model water-flooded zones for the borehole, wherein each model water-flooded zone is an elliptical cylinder having finite height and semi-axes; and fitting the gravity field change to one of the predicted gravity field changes corresponding to one of the plurality of elliptical cylinder model water-flooded zones.

The gravity field change may comprise a difference between a first estimated gravity field in the injector well borehole before injection and a second estimated gravity field in the injector well borehole after injection. The method may include taking a set of gravity measurements at a plurality of depths in the injector well borehole to estimate at least one of i) the first estimated gravity field; and ii) the second estimated gravity field. The water flood may be an areal sweep. The method may include estimating the uncertainty of the estimated horizontal elongation. The method may include creating a model of the formation using the estimated horizontal elongation of the water-flooded zone. The method may include conducting secondary recovery operations in dependence upon the model.

Other embodiments may include a non-transitory computer-readable medium product for characterizing a water-flooded zone in an earth formation resulting from injection of water to the formation through an injector well borehole intersecting the formation, the medium having instructions thereon that, when executed, cause at least one processor to perform a method described herein. The method may include estimating horizontal elongation of the water-flooded zone using a gravity field change in the injector well borehole. The medium product may include at least one of: (i) a ROM, (ii) an EPROM, (iii) an EEPROM, (iv) a flash memory, or (v) an optical disk.

Other method embodiments may include characterizing a water-flooded zone in an earth formation intersected by an injector well borehole. The method may include estimating elongation of a water-flooded zone by monitoring density changes in the formation from the injector well borehole, wherein the water-flooded zone is modeled as an elliptical cylinder with finite height and semi-axes. The method may further include conducting secondary recovery operations in dependence upon the estimated horizontal elongation of the water-flooded zone. The method may further include creating a model of the formation using the estimated horizontal elongation of the water-flooded zone. The method may further include conducting secondary recovery operations in dependence upon the model.

Examples of certain features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIG. 8 shows an example hardware environment in accordance with embodiments of the present disclosure.

DETAILED DESCRIPTION

Figure 1:
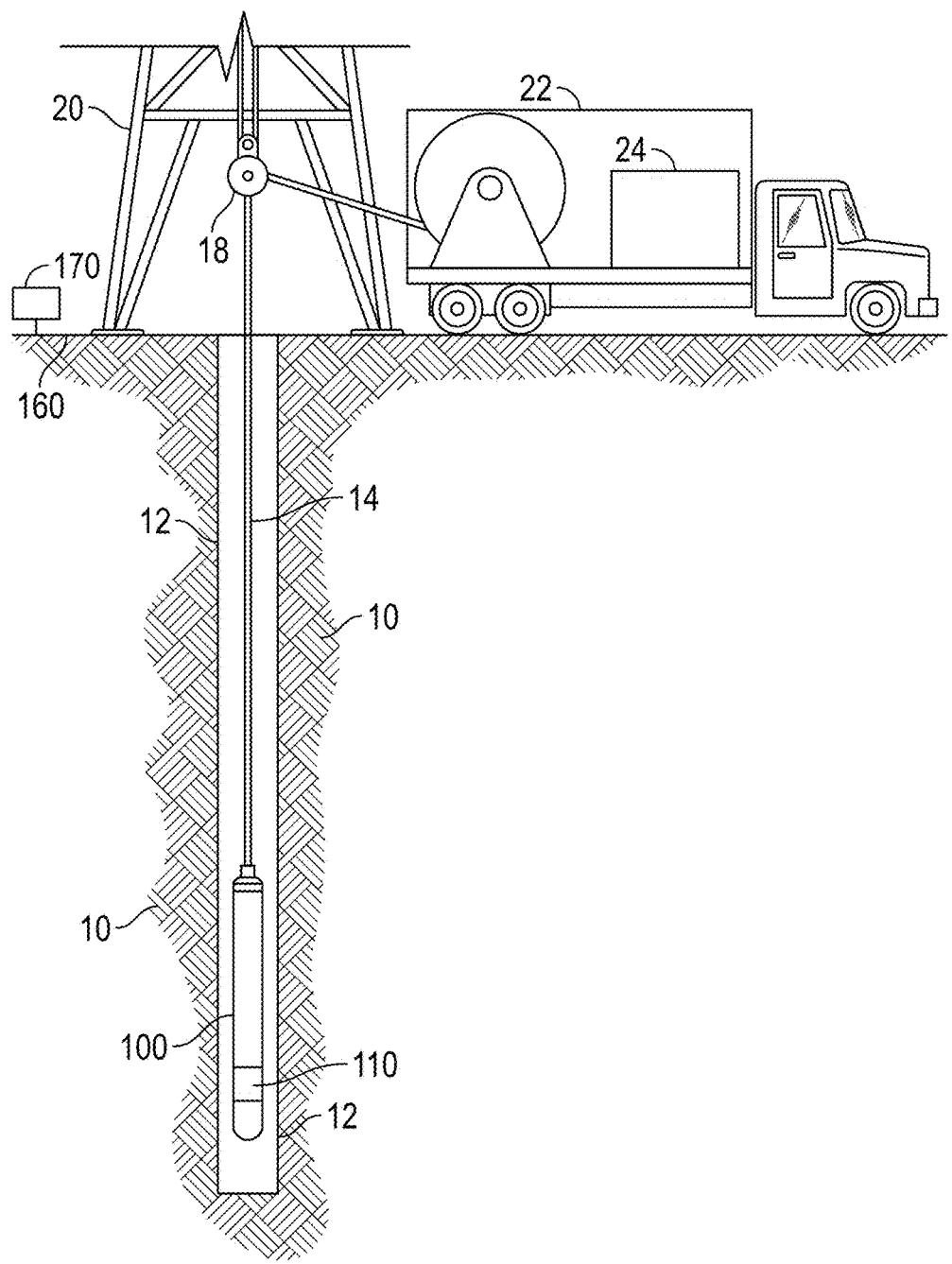
FIG. 1 shows a gravity measurement system in accordance with embodiments of the present disclosure in relation to a cross-section of an earth formation in which is drilled a borehole.

The present disclosure relates to devices and methods for characterizing a water-flooded zone in an earth formation using gravitational measurements taken in a borehole intersecting the formation. These measurements may be taken periodically to detect changes in gravitational acceleration over time at a specific location. The borehole may be an injector well borehole used to create the water-flooded zone. The method may include estimating dimensions of the water-flooded zone or the movement of the water-flooded zone over time. The present disclosure is susceptible to embodiments of different forms. There are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

In secondary oil recovery, an external fluid such as water, gel, or gas is injected into the reservoir through one or more injector wells in an area of the formation in fluid communication with one or more production wells. The injector wells may be sited according to a particular pattern, e.g., the five-spot pattern. An area having high water saturation appears in the vicinity of the injector well borehole. This area is known as a water-flooded zone. If the water propagates uniformly in all directions (which is desirable) the result is a substantially symmetric circle-shaped cylinder with a substantially vertical longitudinal axis ('vertical cylinder'). If the water filtrates non-uniformly (e.g., faster in some directions than in others), then the water-flooded zone is elongated in one axis of the horizontal plane. Problematically, elongation leads to bypassed zones, early breakthrough, and low oil recovery rate.

The volume of injected water is typically recorded. Using information obtained about the formation, the volume of the water-flooded zone may be reliably calculated from the volume of injected water, as described in further detail below. Thus, historically, at any point in time the volume of the water-flooded zone is known. However, the shape of the water-flooded zone is more difficult to determine. It would be desirable to characterize the dimensions of the water-flooded zone, such as, for example, to determine the degree of elongation. It would then be possible to control the volume of water injected in dependence upon the elongation and eventually increase the oil recovery rate.

Aspects of the present disclosure include methods for determination of the elongation factor of the water-flooded zone through time-lapse gravity measurements in the injector wells. Since water and hydrocarbons have different densities, water flooding produces known density changes in the water-flooded zone, resulting in changes of the gravity field. Changes in the gravity field (specifically, the vertical component of the gravity field) are particularly noticeable in the injector well (or 'injector'). One or more gravimeters may be used to measure gravitational acceleration at locations in the injector wellbore (and/or at the surface) before and during the injection. The measurements may be used to detect changes in gravitational acceleration at the locations over time. The differences in these measurements may then be used to estimate changes in the gravity field. The gravity field changes will depend on the volume and shape of the water-flooded zone. Affects of the volume and shape of the water-flooded zone may be modeled. One specific application uses such a model in conjunction with the measurement changes to reconstruct the water-flooded zone or its characteristics.

In general, time-lapse gravity field measurements are insufficient for full reconstruction of the water-flooded zone without additional information. However, using the porosity of the formation and the volume of the injected water, methods of the present disclosure may estimate the volume of the water-flooded zone. Using the initial and current water saturations and the oil-water density contrast, methods may estimate bulk density changes.

Aspects of the disclosure estimate the dimensions of the water-flooded zone using the volume and bulk density changes. Some embodiments may model the water-flooded zone as a simple shape, such as, for example, an elliptical cylinder. Thickness of the reservoir is determined using known methods, such as, for example using density or porosity measurements. With a known thickness, an elliptical cylinder may be fully determined by the volume and the ratio of axes. In this model, borehole measurements make it possible to reconstruct the elongation factor of the water-flooded zone. By calculating the gravity field of elliptic cylinders with a fixed volume and different ratios of axes, it may be shown that the respective gravity fields differ by a value measurable by modern borehole gravimeters.

Characterization of the water-flooded zone may be carried out at the stage of recovery wherein the water-flooded zone has dimensions of a few hundred meters, i.e., at the initial stages. In this case the density changes caused by injection and production in other boreholes may be distant (greater than 500 meters) and the corresponding gravity field changes may be negligibly small.

FIG. 1 shows a gravity measurement system in accordance with embodiments of the present disclosure in relation to a cross-section of an earth formation 10 in which is drilled a borehole 12. Suspended within the borehole 12 at the bottom end of a carrier such as a wireline 14 is a well tool 100. The wireline 14 may be carried over a pulley 18 supported by a derrick 20. Wireline deployment and retrieval may be performed by a powered winch carried by a service truck 22, for example. A control panel 24 interconnected to the device 100 through the wireline 14 by conventional means controls transmission of electrical power and data/command signals, and also provides control over operation of the components in the device 100.

In embodiments, the tool 100 may be configured to collect information regarding force or acceleration. An illustrative device 100 may include a gravimeter 110. Gravimeter 110 may be a single-component gravimeter or a multi-component gravimeter. Device 100 may be specially configured to take gravimetric measurements and/or to carry gravimeter 110. The gravimeter 110 may include one or more of: (i) a relative gravimeter and (ii) an absolute gravimeter. The gravimeter may include (i) a single axis gravimeter or (ii) a vector gravimeter. The gravimeter 110 may include an interferometric gravimeter. A non-limiting example of an interferometric gravimeter may include a proof-mass on a spring comprising at least one side of at least one Fabry-Perot etalon. A suitable light source may impinge on the etalon and interrogate the etalon's response to acceleration due to gravity. Depending on the operating principle of the device 100, the device 100 may be configured to operate under surface and borehole conditions. In other embodiments, gravimeter 110 from device 100, may be used at the surface 160. The borehole 12 may also intersect surface 160 at a point 170, which may be the well head.

A water-flooded zone of an earth formation may be characterized in accordance with embodiments of the invention by using at least one gravimeter configured to generate gravity information by measuring the acceleration of gravity at a particular location (i.e., taking a gravity measurement). The at least one gravimeter 110 may be deployed at the surface of the earth formation (e.g., at point 170 or elsewhere at the surface 160) or within the earth formation in or near a volume of interest, such as, for example, in injector borehole 12. In some implementations, a plurality of gravimeters 110 may be used in multiple locations. The volume of interest may be a hydrocarbon reservoir. In some embodiments, the at least one gravimeter may include one or more vector gravimeters positioned in one or more boreholes penetrating an earth formation.

Device 100 may also be configured to deploy the gravimeter 110 within the borehole 12 to a fixed position. The gravimeter 110 may be detachable from the tool 100. The position of the gravimeter 110 may be estimated using methods well known within the hydrocarbon production community. An example would be to use the depth as measured along the borehole in combination with data from a well survey. Another example would be to detect a particular reference feature at the target depth by detecting the specific feature.

At the selected depth, the gravimeter 110 may be positioned against the borehole wall 12, such as by a mechanism like a hydraulic cylinder, and attached to the earth formation or borehole casing by some method known to those skilled in the art of permanent sensing. A measurement of the gravity vector may be made by the gravimeter 110 before the attachment mechanism is retracted into tool 100.

In some embodiments, tool 100 may include a device configured to detect and/or estimate fluid flow in the formation 10. For example, the tool 100 may be configured to detect measurements used to estimate dimensions of a water-flooded zone. Fluid saturation and other fluid movement parameters may be estimated by comparing gravitational acceleration measurements with other gravitational acceleration measurements over time.

Figure 2:
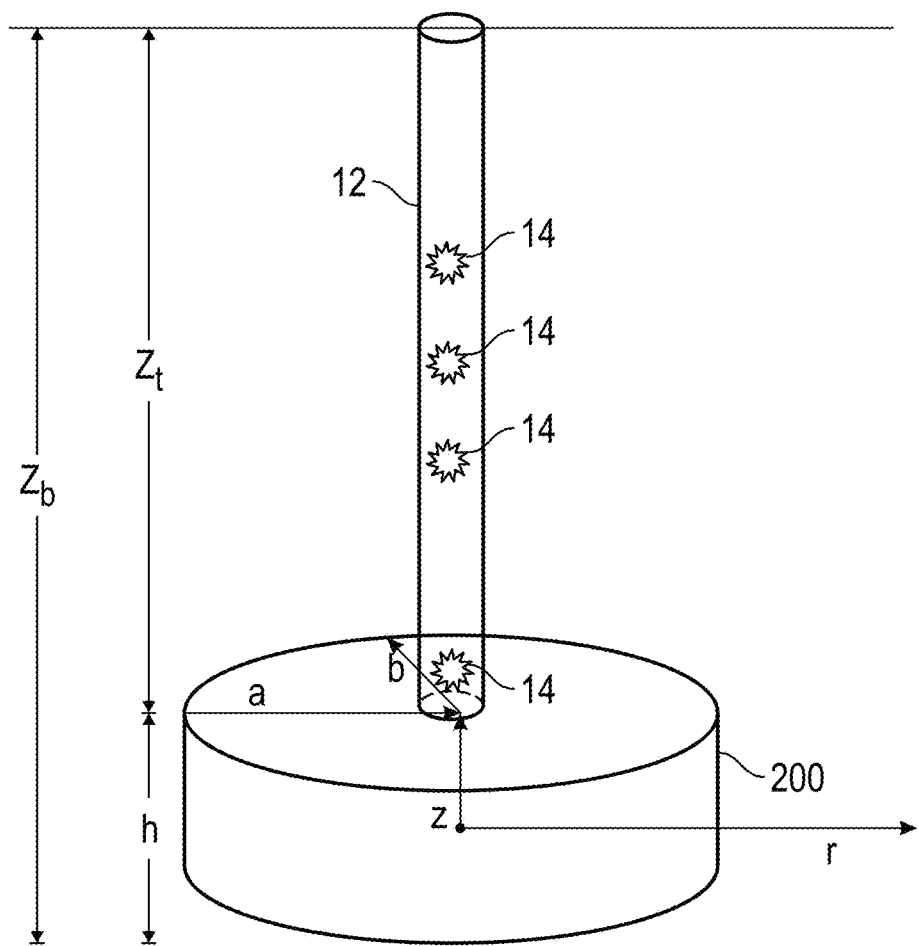
FIG. 2 shows an illustration of a model flooded zone surrounding an injector borehole in an earth formation.

FIG. 2 shows an illustration of a model flooded zone 200 surrounding an injector borehole 12 in an earth formation 10. Gravity measurements 14 may be made in the injector borehole 12 at various depths. Additional gravity measurements may also be made at the surface 160, such as, for example, at point 170.

Aspects of the present disclosure may model the flooded zone 200 as an elliptical cylinder with thickness h and semi-axes a and b, wherein the top of the flooded zone 200 lies at depth $z_t$. A circular cylinder is a special case of the elliptical cylinder wherein the ratio of axes is 1. The semi-axes are determined by the relation $ab=r^2$ which fixes the volume as $$V=\pi r^2 h,$$

and also the relation $a/b=c$, which determines the elongation. Thus, $a=r\sqrt{c}$ and $b=r/\sqrt{c}$.

In the present disclosure, the density of injected fluids is known, as is density, porosity, and fluid content of the formation before injection. The density change of the flood zone may be determined using $$\Delta\rho=(\text{porosity})\cdot(\rho_{water}-\rho_{oil})$$

where example values may be: 0.2 for porosity, 1.06 g/cm³ for water density, and 0.85 g/cm³ for oil density, resulting in $\Delta\rho$ of 0.042 g/cm³. Example values may be 2000 meters for the top depth $z_t$, 20-50 meters for height h, and 100 meters for r. Here, r is referred to as the equivalent radius of the elliptical cylinder. Thus, if porosity may be estimated and the volume of injected water is known, the equivalent radius may be directly calculated.

Figure 3A:
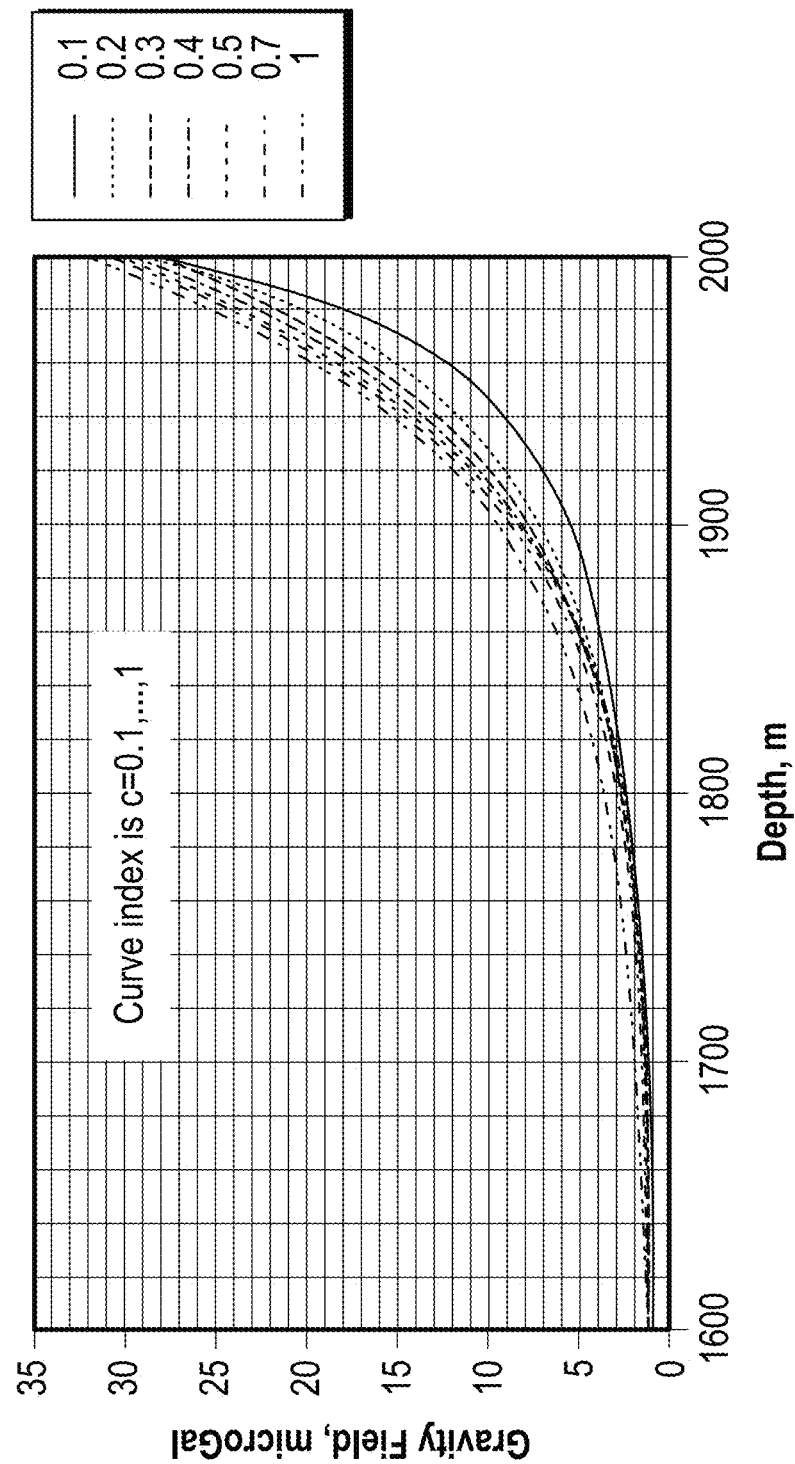
FIGS. 3A and 3B show graphical depictions illustrating gravity fields of the model cylinder for various values of c.
Figure 3B:
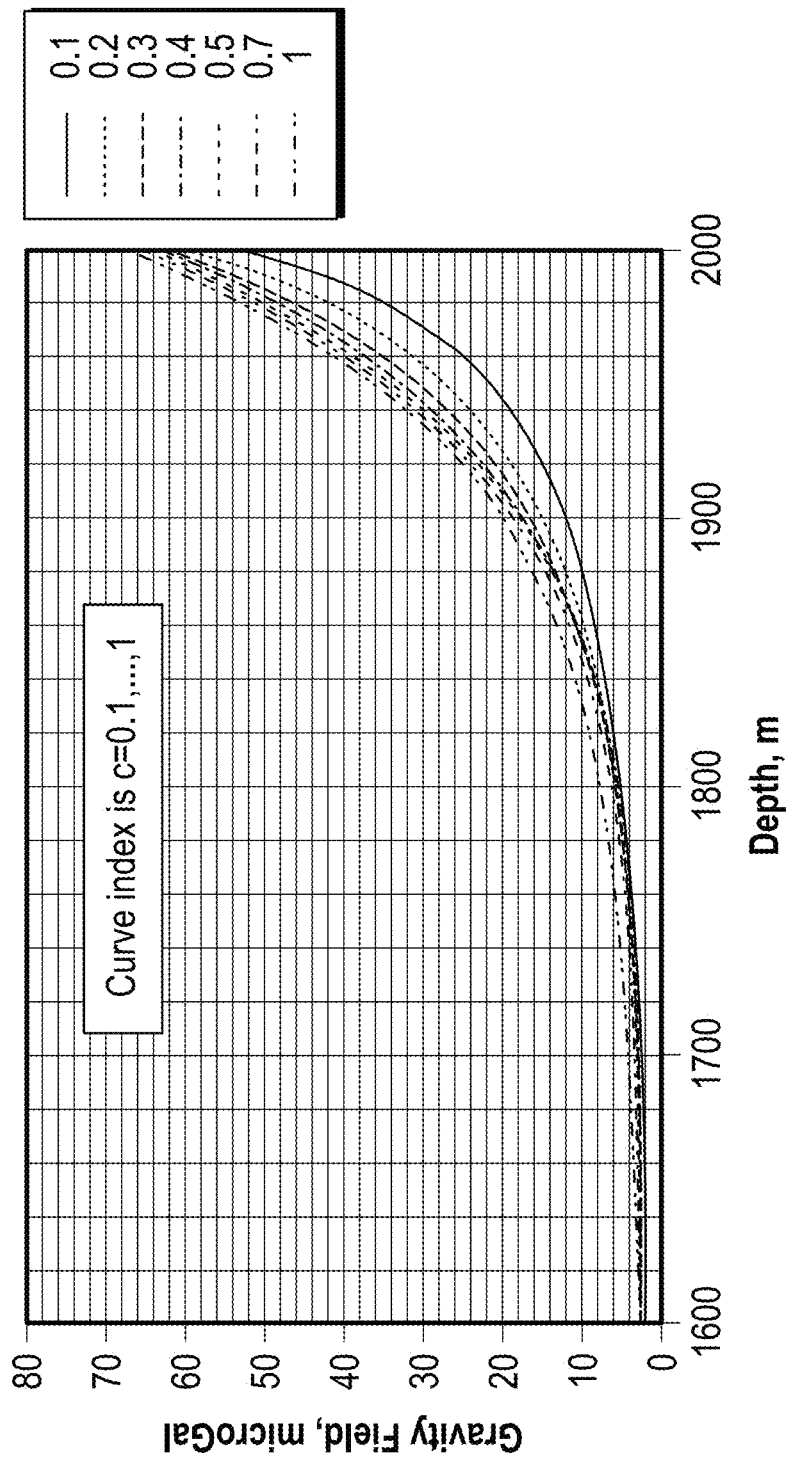
Figure 4A:
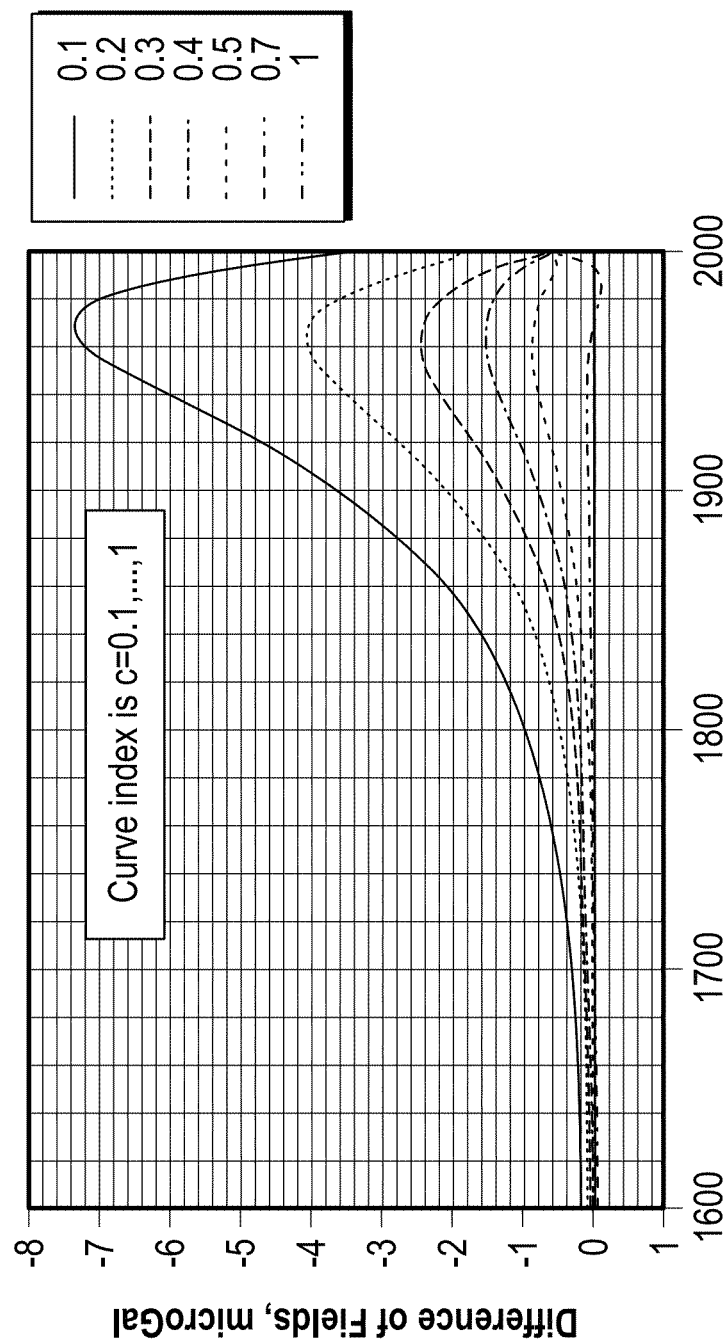
FIGS. 4A and 4B show graphical depictions illustrating the difference between the gravity field for circular cylinders and elliptical cylinders with various values of c with respect to depth.
Figure 4B:
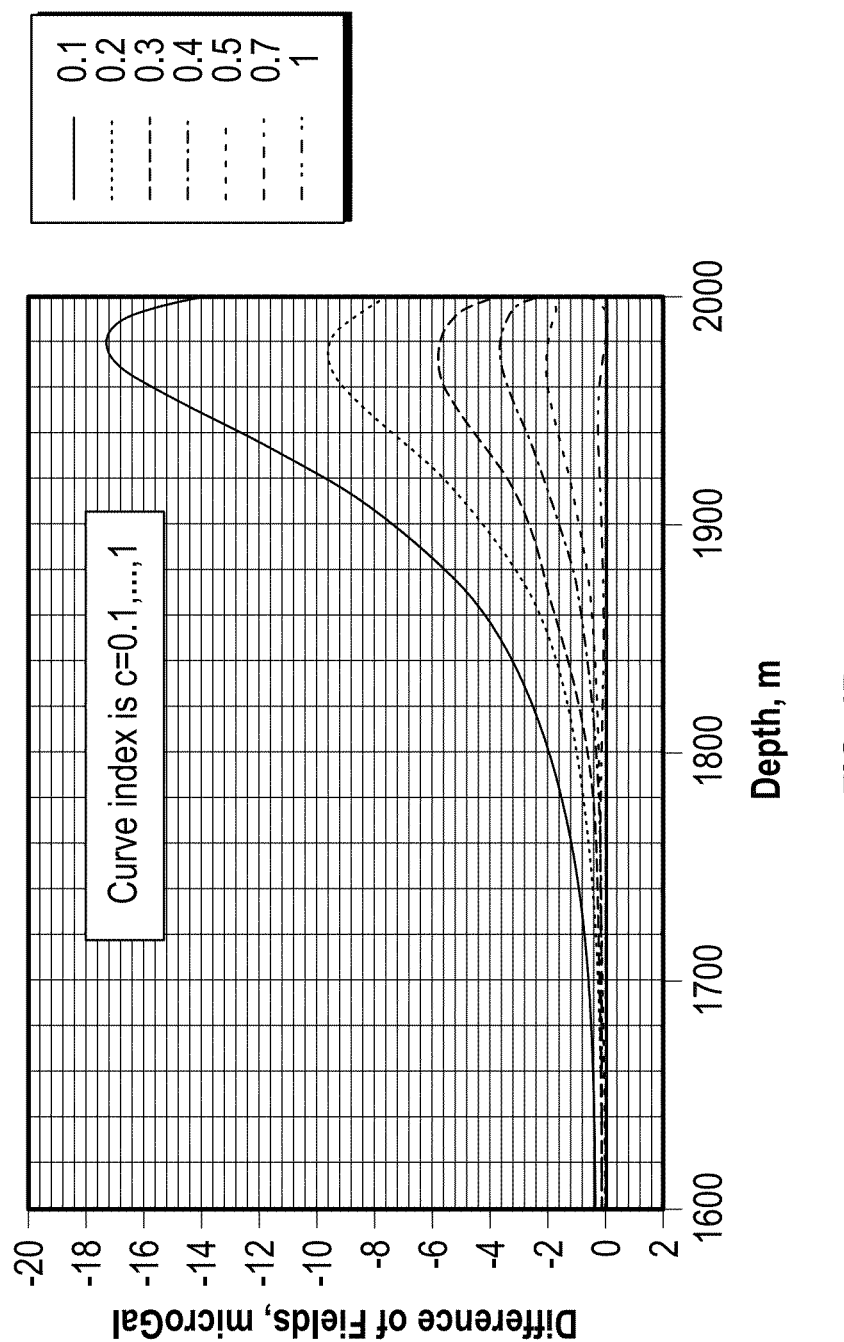

FIGS. 3A and 3B show graphical depictions illustrating gravity fields of the model cylinder for various values of c. FIGS. 4A and 4B show graphical depictions illustrating the difference between the gravity field for circular cylinders and elliptical cylinders with various values of c with respect to depth. FIGS. 3A and 4A relate to modeled cylinders with an equivalent radius of 100 meters and a height of 20 meters. FIGS. 3B and 4B relate to modeled cylinders with an equivalent radius of 100 meters and a height of 50 meters.

Uncertainty of elongation of the water-flooded zone may be calculated. Using the volume of injected water as a priori information reduces the uncertainty of elongation of the water-flooded zone found from the time-lapse measurement of the gravity field in the injector.

Using the values $r_o$ and $c_o$ for r and c respectively, the mean-square deviation may be calculated using the equation $$R(r,c) = \frac{\sqrt{\sum_{s=1}^{S}(g(z_s,r,c)-g(z_s,r_0,c_0))^2}}{S}$$

where $g(z_s,r,c)$ is the gravity field at the sth sensor (of S) for the parameters r and c.

Figure 5A:
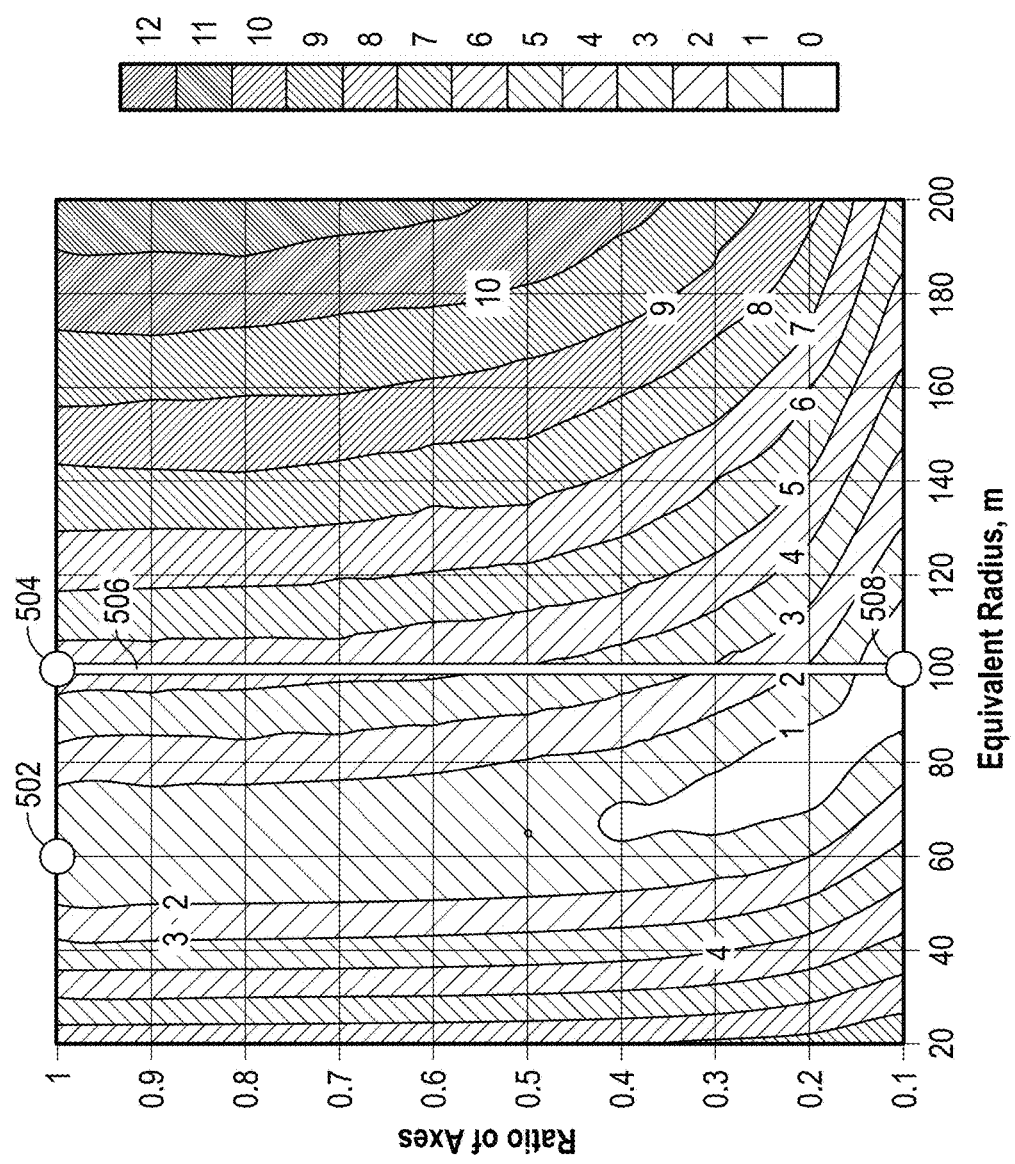
FIGS. 5A and 5B show a graphical depiction of the mean-square deviation illustrating the uncertainty domain for $r=r0$ and $c=c0$.
Figure 5B:
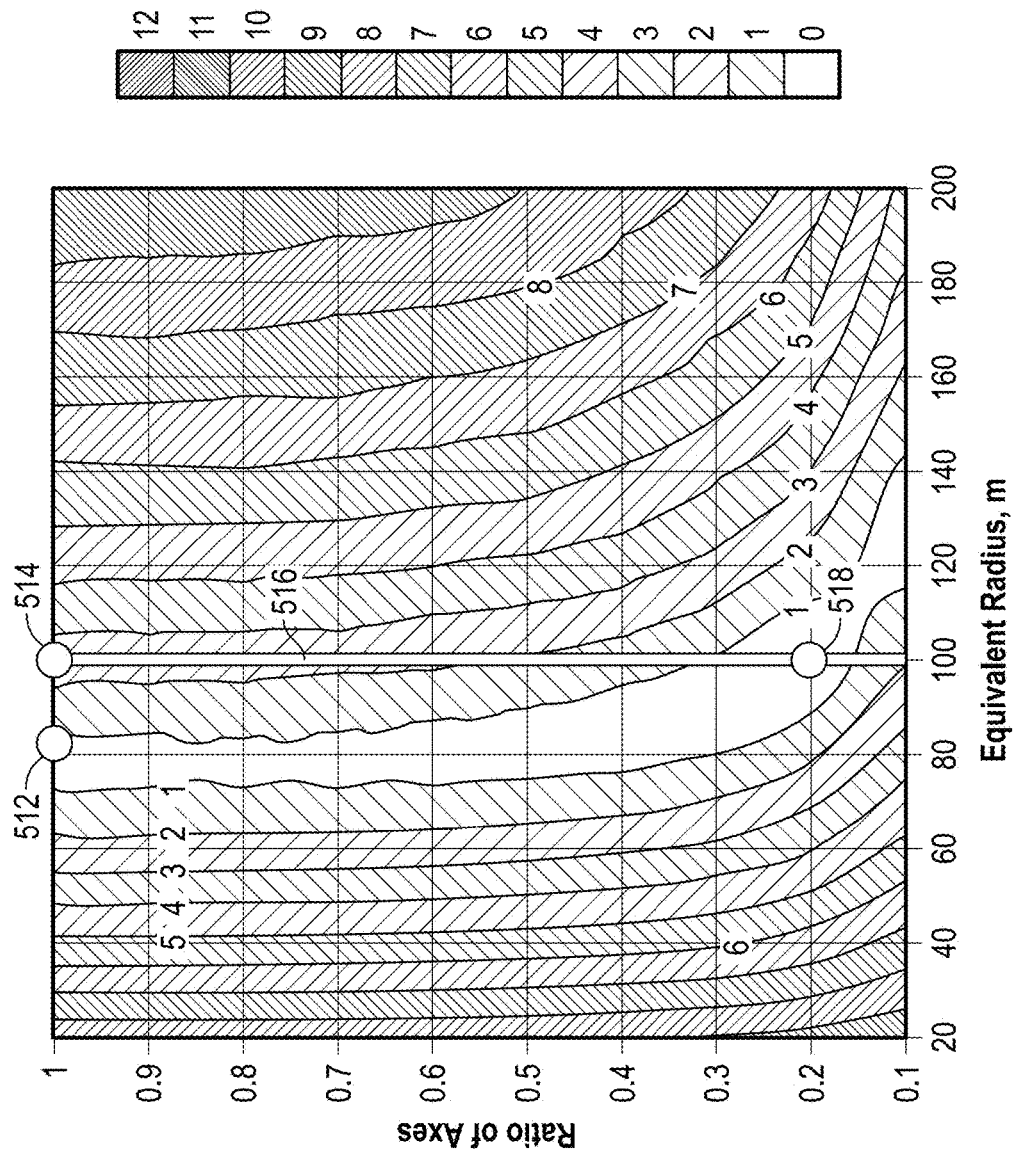

FIGS. 5A and 5B show a graphical depiction of the mean-square deviation illustrating the uncertainty domain for $r=r_0$ and $c=c_0$. FIG. 5A illustrates mean-square deviation for an elliptical cylinder with $r=100$ and $c=0.1$. FIG. 5B illustrates mean-square deviation for an elliptical cylinder with $r=100$ and $c=0.2$. The level line step is 1 µGal.

If R(r,c) is less than the sensor error level, then the body with parameters r and c cannot be distinguished from the body with parameters $r_0$ and $c_0$ using time-lapse gravity field measurements. Referring to FIGS. 5A and 5B, marker 508 designates the point ($r_0$, $c_0$). It is readily apparent from FIGS. 5A and 5B that:

1. If the equivalent radius (volume of injected water) is unknown, then there is a circular cylinder (c=1) of a certain radius 502, 512 with close gravity data (e.g., less than 2 µGal).
2. If the equivalent radius is available as a priori information, optimization may be restricted to the line $r=r_0$ (506, 516) and the gravity field of the respective circular cylinder (c=1) (508, 518) differs by 4-5 µGal for $c_0=0.1$ and 2-3 µGal for $c_0=0.2$.

Thus, by modeling the flood zone as an elliptical cylinder, knowledge of the volume of injected water makes it possible to distinguish the elongation of order 0.1-0.2 using time-lapse gravity field measurements in the injector.

Figure 6:
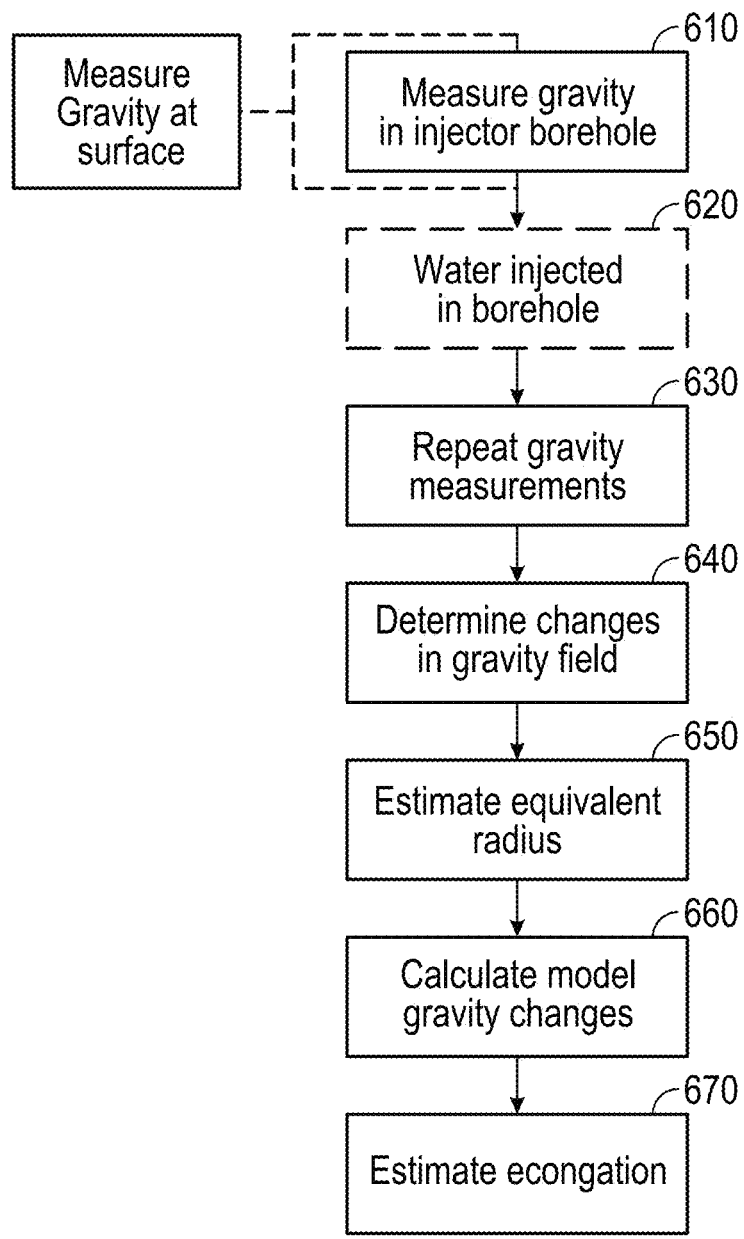
FIG. 6 shows a flow chart of one embodiment of a method for characterizing dimensions of a water-flooded zone in an earth formation intersected by an injector borehole according to the present disclosure.

FIG. 6 shows a flow chart of one embodiment of a method 600 for characterizing dimensions of a water-flooded zone in an earth formation intersected by an injector borehole according to the present disclosure. Method 600 includes step 610, measuring gravitational acceleration at a specific location with gravimeter 110 at multiple depths in an injector borehole 12. The multiple depths may range from 0 to 400 meters above the reservoir top. Position information for the gravimeter may also be recorded. Position information may include location (relative or global position), depth, and orientation (geographical, magnetic, etc.).

In optional step 620, water is injected via the injector borehole. Next is step 630, where the gravitational measurements are repeated after a period of time. Step 640 includes determining from the measurements the changes in the gravity field between the first set of measurements before the injection and the second set of measurements after the injection. Step 650 includes using the volume of injected water, the porosity of the formation, and the difference in density between the flooding material (e.g., water) and the displaced hydrocarbon (e.g., oil) to estimate the equivalent radius of the water-flooded zone.

Step 660 includes calculating the model gravity field changes of the water-flooded zone with the estimated equivalent radius and a multitude of elongations using the elliptical cylinder model of the water-flooded zone. Step 670 includes estimating the elongation by fitting actual gravity changes to model gravity field changes. At least one processor may be used to perform at least steps 640-670.

In some embodiments, multiple measurements may be taken at each depth in the borehole 12 before and/or after injection and/or at the well head 170 or other location in order to calculate the gravity change statistically (e.g., by averaging results), for calibration, or to allow additional calculations adapted to compensate for instrument (sensor) drift, as known in the art.

Optionally, method 600 includes step 605. Step 605 includes measuring gravitational acceleration at the surface. If gravimeter 110 is an absolute or ballistic gravimeter, measurements in the borehole may be sufficient and this step may be omitted. If gravimeter 110 is a relative gravimeter, measurements at the surface provide a reference gravity measurement with respect to the wellhead 170, such that a gravity difference may be determined. Surface gravity measurements may be taken at the first time and/or second time, or proximate thereto (e.g., within an hour, a day, or a week, and so on), or may be taken at different times and then reconciled using methods well known in the art. Step 605 may include multiple measurements at any or all of the above times.

In other optional steps, the information may be transmitted to a processor configured to characterize the water-flooded zone. Optionally, method 600 includes additional steps which include modifying gravitational information (e.g., measurements, data, etc.) to compensate for known phenomena. Known phenomena may include time varying events, such as earth tides, and acute events, such as volcanism and seismic disturbances.

In some embodiments, one or more of the steps may be optional. In some embodiments, some or all of the steps may be repeated, or a sequence of steps may be repeated, for example, to improve sample size without repeating all steps.

Figure 7:
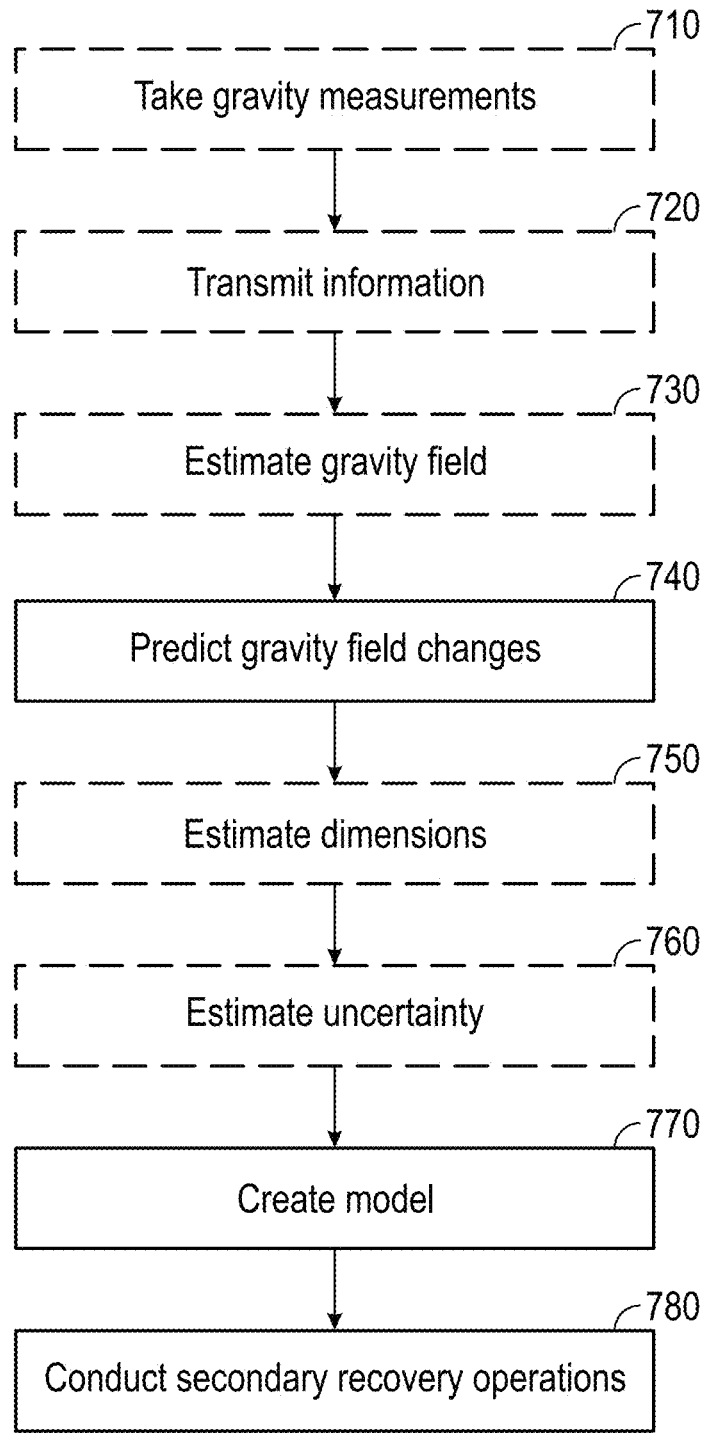
FIG. 7 shows a flow chart of one embodiment of a method for characterizing a water-flooded zone in an earth formation intersected by an injector borehole according to the present disclosure.

FIG. 7 shows a flow chart of one embodiment of a method 700 for characterizing a water-flooded zone in an earth formation resulting from injection of water to the formation through an injector well borehole intersecting the formation. The injection of water may be part of an areal sweep. Method 700 includes step 740, estimating horizontal elongation of the water-flooded zone using a gravity field change in the injector well borehole. The gravity field change may include a difference between a first estimated gravity field in the injector well borehole before injection and a second estimated gravity field in the injector well borehole after injection.

Optional step 710 may include taking at least one of: i) the first set of gravity measurements, and ii) the second set of gravity measurements. Optional step 720 may include transmitting the information to a processor configured to characterize the water-flooded zone. For example, the measurements may be transmitted to the surface via the carrier for processing. Optional step 730 may include estimating the gravity field change using a first set of gravity measurements taken at a plurality of depths in the injector well borehole before injection and a second set of gravity measurements taken at the plurality of depths in the injector well after injection.

Step 740 may include predicting a gravity field change for each of a plurality of model water-flooded zones for the borehole and fitting the gravity field change to one of the predicted gravity field changes corresponding to one of the plurality of elliptical cylinder model water-flooded zones. Each model water-flooded zone may be an elliptical cylinder having finite height and semi-axes. Step 740 may be performed before step 720 or 730.

Optional step 750 may include estimating the dimensions of the water-flooded zone. Optional step 760 may include estimating the uncertainty of the estimated horizontal elongation.

Optional step 770 may include creating a model of the formation in dependence upon the estimated horizontal elongation. For example, the model may use estimated dimension derived from the estimated horizontal elongation. Optional step 780 may include conducting secondary recovery operations in dependence upon the model; the estimated horizontal elongation, the axis of elongation, or the dimensions of the water-flooded zone; or combinations of these. Secondary recovery operations may be carried out in dependence upon the characterization of the water-flooded zone. Secondary recovery operations may include any or all of drilling operations, injection operations, production operations, and the like. For example, the method may include commencing, modifying, continuing, or halting one or more injection operations in dependence upon a model of the formation including a characterization of the water-flooded zone based on the dimensions and axis of elongation of the water-flooded zone.

Other method embodiments may include characterizing a water-flooded zone in an earth formation intersected by an injector well borehole. Such methods may include estimating elongation of a water-flooded zone by monitoring density changes in the formation from the injector well borehole, wherein the water-flooded zone is modeled as an elliptical cylinder with finite height and semi-axes. The methods may also include estimating the dimensions of the water-flooded zone and/or creating a model of the formation in dependence upon the estimated horizontal elongation. Methods may further include conducting secondary recovery operations in dependence upon the model; the estimated horizontal elongation, the axis of elongation, or the dimensions of the water-flooded zone; or combinations of these.

As shown in FIG. 8, certain embodiments of the present disclosure may be implemented with a hardware environment that includes an information processor 800, an information storage medium 810, an input device 820, processor memory 830, and may include peripheral information storage medium 840. The hardware environment may be in the well, in the device 100, at the rig, or at a remote location. Moreover, the several components of the hardware environment may be distributed among those locations. The input device 820 may be any information reader or user input device, such as data card reader, keyboard, USB port, etc. The information storage medium 810 stores information provided by sensors on device 100, including one or more gravimeters 110. Information storage medium 810 may be any non-transitory computer information storage device, such as a ROM, USB drive, memory stick, hard disk, removable RAM, EPROMs, EAROMs, EEPROM, flash memories, and optical disks or other commonly used memory storage system known to one of ordinary skill in the art including Internet based storage. Information storage medium 810 stores a program that when executed causes information processor 800 to execute the disclosed method. Information storage medium 810 may also store formation information, or the formation information may be stored in a peripheral information storage medium 840, which may be any standard computer information storage device, such as a USB drive, memory stick, hard disk, removable RAM, network based storage or other commonly used memory storage system known to one of ordinary skill in the art including Internet based storage.

Information processing device 800 may be any form of computer or mathematical processing hardware, including Internet based hardware. When the program is loaded from information storage medium 810 into processor memory 830 (e.g. computer RAM), the program, when executed, causes information processing device 800 to retrieve gravity information from either information storage medium 810 or peripheral information storage medium 840 and process the information to estimate a parameter of interest. Information processor 800 may be located on the surface or downhole.

As used above, an information processing device is any device that transmits, receives, manipulates, converts, calculates, modulates, transposes, carries, stores, or otherwise utilizes information. In several non-limiting aspects of the disclosure, an information processing device includes a computer that executes programmed instructions for performing various methods. Herein, the term "information" may include one or more of: raw data, processed data, and signals.

The term "carrier" as used above means any device, device component, combination of devices, media and/or member that may be used to convey, house, support, or otherwise facilitate the use of another device, device component, combination of devices, media and/or member. Exemplary non-limiting carriers include drill strings of the coiled tube type, of the jointed pipe type, and any combination or portion thereof. Other carrier examples include casing pipes, wirelines, wireline sondes, slickline sondes, drop shots, downhole subs, bottom hole assemblies, drill string inserts, modules, internal housings, and substrate portions thereof.

The device 100 may also include sensors, tools, or instruments configured to: (i) actively or passively collect information about the various characteristics of the formation, (ii) provide information about tool orientation and direction of movement, (iii) provide information about the characteristics of the reservoir fluid and/or (iv) evaluate reservoir conditions (e.g., formation pressure, wellbore pressure, temperature, etc.). Exemplary devices may include resistivity sensors (for determining the formation resistivity, dielectric constant and the presence or absence of hydrocarbons), acoustic sensors (for determining the acoustic porosity of the formation and the bed boundary in the formation), nuclear sensors (for determining the formation density, nuclear porosity and certain rock characteristics), and nuclear magnetic resonance sensors (for determining the porosity and other petrophysical characteristics of the formation). Other exemplary devices may include gyroscopes, magnetometers, and sensors that collect formation fluid samples and determine the properties of the formation fluid, which include physical properties and chemical properties.

In some embodiments, the borehole 12 may be utilized to recover hydrocarbons. In other embodiments, the borehole 12 may be used for geothermal applications, water production, mining, tunnel construction, or other uses.

The term "information" may include, but is not limited to, one or more of: (i) raw data, (ii) processed data, and (iii) signals. A "gravimeter" may be any device configured to estimate acceleration due to the gravitational properties of matter. The at least one gravimeter may include a vector gravimeter. A "vector gravimeter" may be any device configured to estimate the vector components of acceleration due to gravitational properties of matter. A vector gravimeter may be formed using three single axis gravimeters with linearly independent orientations.

The term "equivalent radius" of a volume may be defined as a radius corresponding to a circular cylinder of the volume with a particular height.

While the disclosure has been described with reference to exemplary embodiments, it will be understood that various changes may be made and equivalents may be substituted for elements thereof without departing from the scope of the disclosure. In addition, many modifications will be appreciated to adapt a particular instrument, situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

We claim:

1. A method of characterizing a water-flooded zone in an earth formation resulting from injection of water to the formation through an injector well borehole intersecting the formation, the method comprising:
   estimating horizontal elongation of the water-flooded zone using a gravity field change over time measured in the injector well borehole, comprising:
      predicting a gravity field change due to the injection of water for each of a plurality of model water-flooded zones for the borehole, wherein each model water-flooded zone is an elliptical cylinder having finite height and semi-axes; and
      fitting the measured gravity field change to one of the predicted gravity field changes corresponding to one of the plurality of elliptical cylinder model water-flooded zones;
   creating a model of the formation by using the estimated horizontal elongation of the water-flooded zone to estimate dimensions of the water-flooded zone; and
   conducting secondary recovery operations in dependence upon the model, wherein the secondary recovery operations comprise at least one of: i) drilling operations in the formation, ii) injection operations in the formation, and iii) production operations in the formation;
   wherein the horizontal elongation is an elongation of the water-flooded zone in one axis of a plane normal to a vertical longitudinal axis.

2. The method of claim 1, wherein the gravity field change comprises a difference between a first estimated gravity field in the injector well borehole before injection and a second estimated gravity field in the injector well borehole after injection.

3. The method of claim 2, further comprising taking a set of gravity measurements at a plurality of depths in the injector well borehole to estimate at least one of i) the first estimated gravity field; and ii) the second estimated gravity field.

4. The method of claim 1, further comprising estimating a measure of uncertainty of the estimated horizontal elongation.

5. The method of claim 1, further comprising estimating the dimensions of the water-flooded zone.

6. The method of claim 1, further comprising creating a model of the formation using the estimated horizontal elongation of the water-flooded zone.

7. The method of claim 6, further comprising conducting secondary recovery operations in dependence upon the model.

8. A non-transitory computer-readable medium product for characterizing a water-flooded zone in an earth formation resulting from injection of water to the formation through an injector well borehole intersecting the formation, the medium having instructions thereon that, when executed, cause at least one processor to perform a method, the method comprising:
   estimating horizontal elongation of the water-flooded zone using a gravity field change in the injector well borehole, comprising:
      predicting a gravity field change due to the injection of water for each of a plurality of model water-flooded zones for the borehole, wherein each model water-flooded zone is an elliptical cylinder having finite height and semi-axes; and
      fitting the measured gravity field change to one of the predicted gravity field changes corresponding to one of the plurality of elliptical cylinder model water-flooded zones;
   creating a model of the formation by using the estimated horizontal elongation of the water-flooded zone to estimate dimensions of the water-flooded zone; and
   conducting secondary recovery operations in dependence upon the model, wherein the secondary recovery operations comprise at least one of: i) drilling operations in the formation, ii) injection operations in the formation, and iii) production operations in the formation;
   wherein the horizontal elongation is an elongation of the water-flooded zone in one axis of a plane normal to a vertical longitudinal axis.

9. The non-transitory computer-readable medium product of claim 8 further comprising at least one of: (i) a ROM, (ii) an EPROM, (iii) an EEPROM, (iv) a flash memory, or (v) an optical disk.

10. A method of characterizing a water-flooded zone in an earth formation intersected by an injector well borehole, the method comprising:
    estimating elongation of a water-flooded zone by monitoring density changes in the formation from the injector well borehole, wherein the water-flooded zone is modeled as an elliptical cylinder with finite height and semi-axes, comprising:
       predicting a density change due to the injection of water for each of a plurality of model water-flooded zones for the borehole, wherein each model water-flooded zone is an elliptical cylinder having finite height and semi-axes; and
       fitting the density change to one of the predicted density changes corresponding to one of the plurality of elliptical cylinder model water-flooded zones fitting the density change to one of the predicted density changes corresponding to one of the plurality of elliptical cylinder model water-flooded zones;
    creating a model of the formation by using the estimated horizontal elongation of the water-flooded zone to estimate dimensions of the water-flooded zone; and
    conducting secondary recovery operations in dependence upon the model, wherein the secondary recovery operations comprise at least one of: i) drilling operations in the formation, ii) injection operations in the formation, and iii) production operations in the formation.

11. The method of claim 10, further comprising estimating the dimensions of the water-flooded zone.

12. The method of claim 10, further comprising conducting secondary recovery operations in dependence upon the estimated horizontal elongation of the water-flooded zone.

13. The method of claim 10, further comprising creating a model of the formation using the estimated horizontal elongation of the water-flooded zone.

14. The method of claim 13, further comprising conducting secondary recovery operations in dependence upon the model.

* * * * *